United States Patent [19]

Sato et al.

[11] 4,210,394
[45] Jul. 1, 1980

[54] SHUTTER TIME TEMPERATURE COMPENSATING DEVICE IN A CAMERA

[75] Inventors: Akihiko Sato, Tokyo; Tetsuro Goto, Funabashi, both of Japan

[73] Assignee: Nippon Kogaku K.K., Tokyo, Japan

[21] Appl. No.: 942,304

[22] Filed: Sep. 14, 1978

[30] Foreign Application Priority Data

Sep. 20, 1977 [JP] Japan .................................. 52-112200

[51] Int. Cl.² .............................................. G03B 9/62
[52] U.S. Cl. .................................. 354/234; 354/23 D; 354/6 DR
[58] Field of Search .............. 354/23 D, 50, 51, 60 R, 354/234, 235

[56] References Cited

U.S. PATENT DOCUMENTS

| | | | |
|---|---|---|---|
| 3,863,263 | 1/1975 | Itagaki | 354/60 R X |
| 4,000,498 | 12/1976 | Tunekawa et al. | 354/60 R X |

Primary Examiner—Michael L. Gellner
Attorney, Agent, or Firm—Shapiro and Shapiro

[57] ABSTRACT

An electrical circuit for compensating for variations in the shutter time of the shutter mechanism in a camera which are caused by temperature variations comprises a temperature detecting circuit which generates an output voltage corresponding to the ambient temperature variation, and a control circuit which generates a compensating voltage based upon the temperature measured by the temperature detecting circuit and the known shutter time temperature characteristic of the shutter mechanism in the camera. The compensating voltage is combined with a shutter time voltage corresponding to a desired shutter time, in such a manner that the resulting voltage, which is used to control the shutter, substantially eliminates shutter time variations caused by temperature variations, thereby rendering shutter time independent of temperature.

18 Claims, 15 Drawing Figures

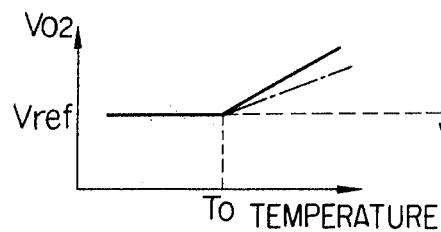
FIG. 5
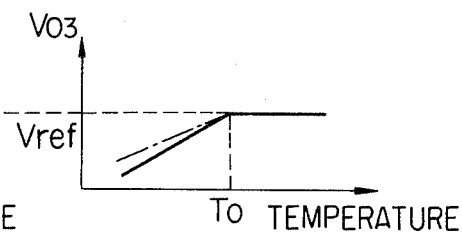
FIG. 6
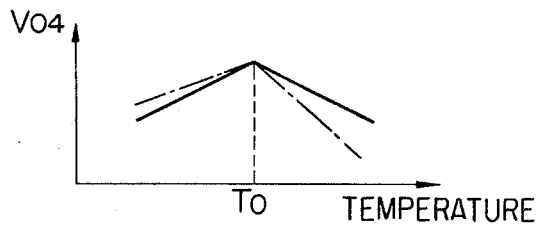
FIG. 7
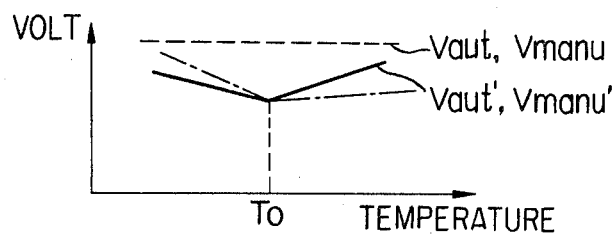
FIG. 8
FIG. 9
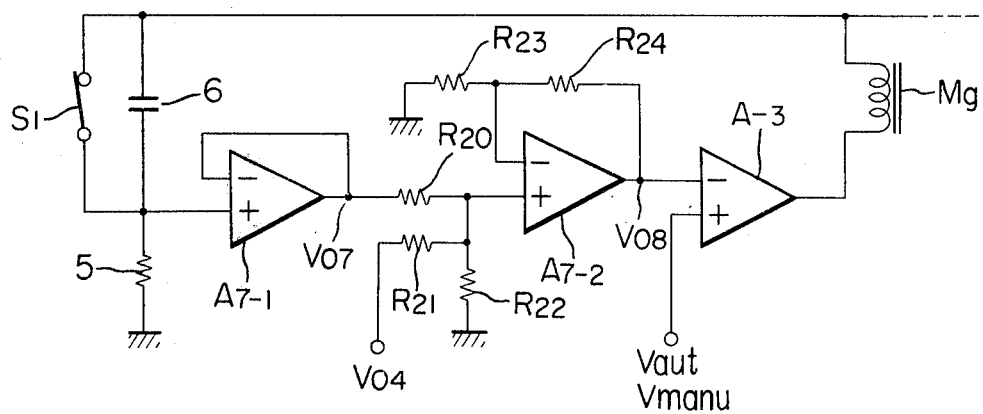

SHUTTER TIME TEMPERATURE COMPENSATING DEVICE IN A CAMERA

BACKGROUND OF THE INVENTION

1. Field of the Invention

This invention relates to a temperature compensating circuit in a camera provided with an electric shutter, and more particularly to a device for compensating for the temperature characteristic of a shutter mechanism such as a focal plane shutter or the like.

2. Description of the Prior Art

In the focal plane shutter of a camera, it is well known that the shutter time is faster or slower due to a variation in temperature. The reason is that the dimensions of the shutter forming member and the viscosity of the lubricating oil are varied by temperature. Such a nature is purely of a mechanism and is peculiar to each shutter.

In a camera having incorporated therein such a shutter mechanism, when it is desired to electrically control the shutter time, it is necessry to compensate for the temperature of the electric circuit which controls the shutter time as well as to compensate for the temperature characteristic of the shutter mechanism. The amount of variation of the shutter time is of the order of several hundred microseconds and therefore, it offers little problem when the shutter time is 1/500 sec. or less, although a variation in shutter time accompanies it. But if the shutter time is 1/1000, 1/2000, 1/4000 sec. etc., the variation in shutter time is non-negligible.

A device has heretofore been proposed in which the variation in dimensions of a bimetal element is utilized to adjust the timing of the movement of the shutter and to compensate for the temperature characteristic of the shutter mechanism. However, the variation in dimensions of the bimetal element takes place only in one direction with respect to temperature and, therefore, the temperature characteristic of the shutter mechanism which can be compensated for must be such that the variation in shutter time takes place in one direction with respect to temperature.

However, actual measurement of the temperature characteristics of the shutter mechanisms in commercially available cameras shows that there is a tendency for the shutter time to be slower on the opposite sides of a certain temperature where it peaks and such tendency cannot be completely compensated for by the prior art technique. In addition a space is required if it is intended to effect mechanical compensation. Further, the conventional control cam for the high-speed shutter time effects adjustment of the shutter time by step differences of the order of several tens of microns and this makes it difficult to effect the shutter time adjustment by the incorporation of a bimetal element. Moreover, such adjustment is cumbersome because it must be effected with the camera actually varied in temperature.

SUMMARY OF THE INVENTION

It is an object of the present invention to overcome the above-noted problems and to provide a so-called electric shutter mountable on a camera for electrically controlling the shutter time and provide a tempeature compensating device equipped with a circuit for imparting to the electric shutter an electrical signal for offsetting the temperature characteristic of the shutter mechanism.

It is another object of the present invention to provide a temperature compensating device which can adjust the aforementioned electrical signal in accordance with the temperature characteristic of the shutter mechanism.

To achieve these objects, the device for compensating for the shutter time temperature characteristic of the shutter mechanism in a camera according to the present invention comprises a first circuit for generating an output corresponding to a shutter time to be controlled, a second circuit for generating an output corresponding to the lapse of time from after which exposure is started, a third circuit for terminating the exposure when the output of said first circuit and the output of said second circuit have assumed a predetermined relationship, a temperature detecting circuit for generating an output corresponding to temperature variation, a circuit for converting the output of said temperature detecting circuit into an output corresponding to the shutter time temperature characteristic of the shutter mechanism, and a circuit for coupling together the output of said converter circuit and the output of said first or said second circuit.

The invention will become more fully apparent from the following deteailed description of the preferred embodiments taken in conjunction with the accompanying drawings.

BRIEF DESCRIPTION OF THE DRAWINGS

FIGS. 4, 5, 6, 7 and 8 illustrate the condition of the output voltage with respect to temperature in the embodiment of FIG. 3.

FIG. 9 is a circuit diagram for inparting information to the integration voltage in FIG. 2.

DESCRIPTION OF THE PREFERRED EMBODIMENTS

Figure 1:
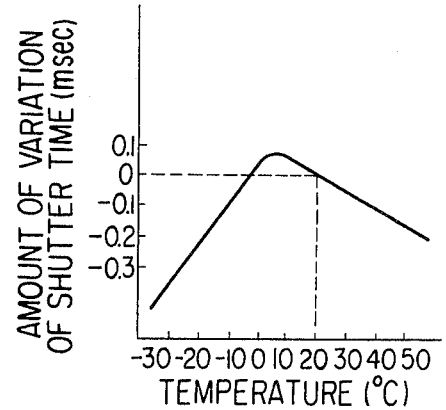
FIG. 1 is a graph illustrating the relation between temperature and amount of variation of the shutter time.

Referring to FIG. 1, it shows the relation between temperature and amount of variation of shutter time. As shown, the amount of variation of shutter time increases in the negative direction (the shutter time becomes slower) on the opposite sides of a certain temperature at which the variation in shutter time peaks. The shutter time at room temperature (20° C.) is the reference amount of variation of the shutter time.

Figure 2:
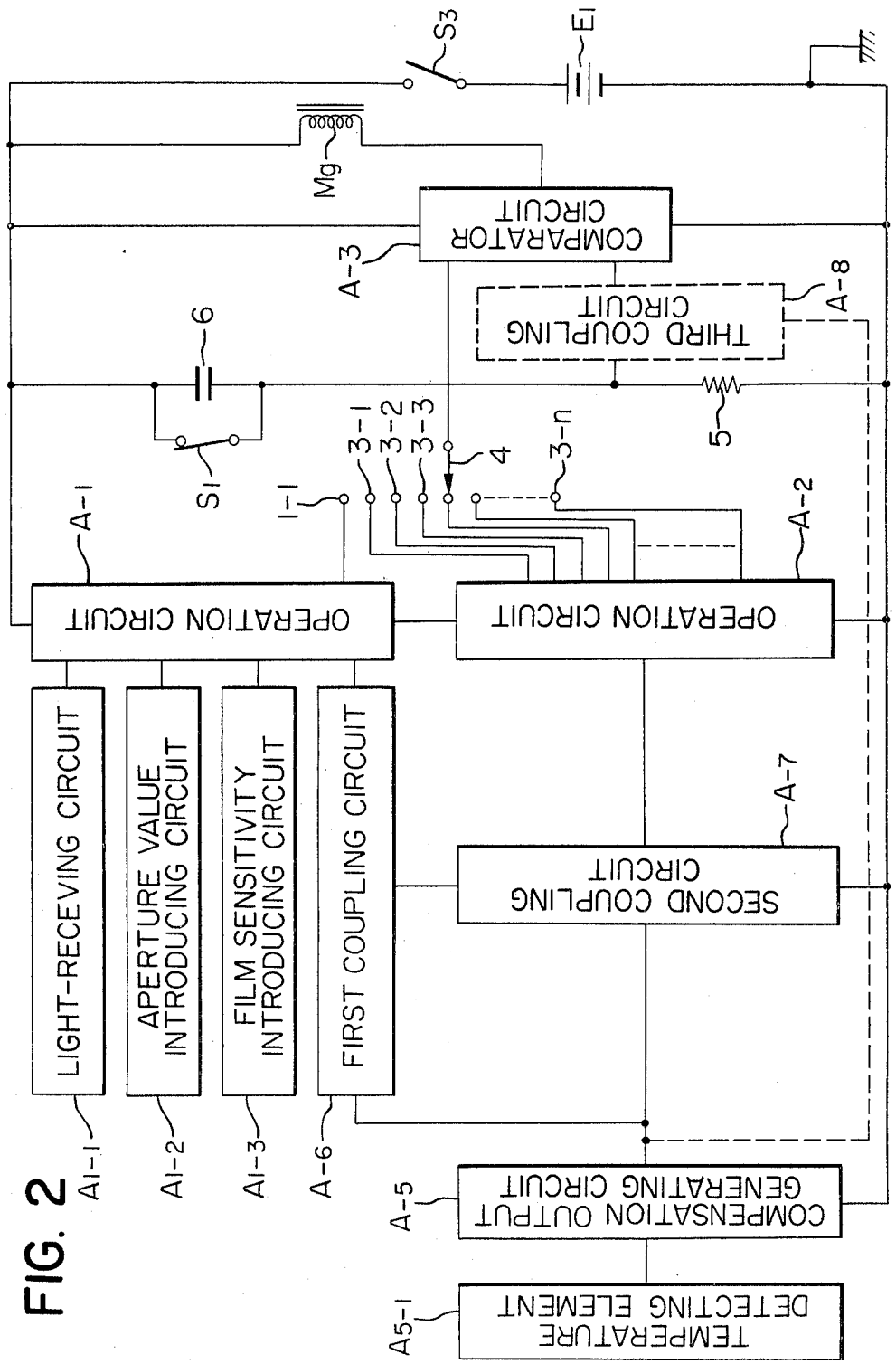
FIG. 2 is a block diagram showing a circuit according to an embodiment of the present invention.

FIG. 2 is a block diagram of the circuit according to an embodiment of the present invention. A light-receiving circuit $A_{1-1}$ has a light-receiving element such as photodiode or the like and produces a voltage corresponding to the brightness of an object to be photographed. An aperture value introducing circuit $A_{1-2}$ produces a voltage corresponding to an aperture value set by the objective lens. A film sensitivity introducing circuit $A_{1-3}$ is operatively associated with the film sensitivity setting dial of the camera and produces a voltage corresponding to the sensitivity of the film loaded into the camera. An operation circuit A-1 for automatic shutter time control receives as exposure factor introducing input the voltages produced by the circuits $A_{1-1}$, $A_{1-2}$ and $A_{1-3}$ and produces at its output terminal 1—1 an auto output voltage $V_{aut}$ corresponding to a shutter time which provides proper exposure. This output voltage is varied correspondingly to the variations of the aforementioned three voltages before the releasing operation of the camera, but when the releasing operation is effected, it is fixed to a value immediately prior to the releasing operation.

The output voltage of an operation circuit A-2 for manual shutter time control is produced by series-connected ladder resistors (not shown). Connected to each of the ladder resistors are output terminals 3-1 to 3-n. A voltage corresponding to a shutter time of 1/4000 sec., for example, is produced at the output terminal 3-1. A voltage corresponding to a shutter time of 1/2000 sec. is produced at the output terminal 3-2, and a voltage corresponding to a slower shutter time is produced as the output terminal 3-n is approached. Therefore, the numer of the output terminals may be the number of controllable shutter times. Hereinafter, the voltages produced at these output terminals 3-1 to 3-n will generally be referred to as the manual output voltage $V_{manu}$.

A slide 4 is connected to an unshown shutter dial of the camera and selects the output terminal 1—1 when the auto shutter time control is to be effected. It also selects any one of the output terminals 3-1 to 3-n which corresponds to a desired shutter speed when manual shutter time control is to be effected. The voltages produced at the output terminals 1—1, 3-1 to 3-n are applied through the slide 4 to one input terminal of comparator circuit A-3.

The output voltage from an integration circuit comprising a resistor 5 and a capacitor 6 is applied to the other input terminal of the comparator circuit A-3. A trigger switch $S_1$ is parallel-connected to the capacitor 6 and assumes its OFF position from the beginning of exposure until at least the termination of exposure and assumes its ON position from the termination of exposure until the beginning of the next exposure. Thus, the integration circuit integrates the lapse of time from the beginning of exposure, and the integration voltage provides the input voltage to the other input terminal of the comparator circuit A-3. The comparator circuit A-3 drives a magnet Mg for restraining the rearward shutter curtain, not illustrated, to terminate exposure when the two input voltages to the comparator circuit assume a predetermined relationship.

When the slide 4 has selected the output terminal 1—1, namely, when the auto shutter time control is to be effected, the auto output voltage corresponding to the shutter time determined by the brightness of the object, the aperture value and the film sensitivity is applied from the operation circuit A-1 to one input terminal of the comparator circuit A-3. When the releasing operation occurs, the forward shutter curtain is moved and the trigger switch $S_1$ is opened to start the charging of the capacitor 6. In this manner, when the auto output voltage $V_{aut}$ and the integration voltage $V_{int}$ assume a predetermined relation (for example, the two voltages becomes equal), the comparator circuit A-3 drives the magnet Mg to move the rearward shutter curtain. In the manner described above, the automatic exposure control (auto photography) followed by diaphragm opening is effected as is well known.

Next, when the slide 4 has selected any one of the output terminals 3-1 to 3-n, namely, when the manual shutter time control is to be effected, a manual output voltage corresponding to any desired shutter time (e.g. 1/2000 sec.) is applied to one input terminal of the comparator circuit A-3. After the releasing operation, a similar operation to that described for the auto control takes place to control the shutter time, As described above, the shutter time only is automatically controlled as is well-known. At this time, the aperture value of the objective lens is suitably adjusted in accordance with the brightness of the object. In the two shutter time controlling operations described, as is apparent from the circuit arrangement, the higher the output voltage $V_{aut}$ or $V_{manu}$, the faster the shutter time, and the lower the output voltage, the slower the shutter time.

Description has hitherto been made of the electrical shutter time controlling function which is the premise for electrically compensating for the temperature characteristic of the shutter mechanism. Now the compensating function will be described hereinafter.

A temperature detecting element $A_{5-1}$ may be a so-called semiconductor such as transistor, diode or the like, or a thermistor or a thermocouple, and the output thereof has a temperature characteristic as is well-known. The output of the temperature detecting element $A_{5-1}$ is converted by a compensation output generating circuit A-5 into an output voltage $V_{can}$ which offsets the temperature characteristic of the aforementioned shutter mechanism. A first coupling circuit A-6 applies an output voltage $V_{can}$ to the operation circuit A-1 and causes the output voltage $V_{aut}$ of the operation circuit A-1 to be given the information of the temperature characteristic of the shutter mechanism. A second coupling circuit A-7 applies the output voltage $V_{can}$ of the circuit A-5 to the operation circuit A-2 and causes the voltage $V_{manu}$ produced at the output terminals 3-1 to 3-n to be given information on the temperature characteristic of the shutter mechanism. Bu doing so, the time when the magnet Mg is driven is varied with ambient temperature and the shutter speed can be maintained constant irrespective of the variation in ambient temperature.

As indicated by a broken line in FIG. 2, even if the output voltage $V_{can}$ of the circuit A-5 is applied to the integration circuit through a third coupling circuit A-8, it can compensate for the temperature characteristic of the shutter mechanism. This is because the comparator circuit A-3 compares the output voltage $V_{aut}$ or $V_{manu}$ with the output voltage $V_{int}$.

The power supply from a power source $E_1$ to the circuit hitherto described is effected by opening-closing of the switch $S_3$. The output of the compensation output generating circuit A-5 may be applied to any one of the operation circuits A-1 and A-2. It is effected when the camera has only one of these two circuits. The above-described circuits may be made into an integrated circuit so as not to occupy a great space and the diode in the integrated circuit may be used when a semiconductor element is employed as the temperature detecting element.

Description will now be made of the specific construction and operation of a compensation circuit comprising the circuits A-5 to A-8 and an element $A_{5-1}$. The temperature characteristic of the shutter mechanism which is to be compensated for will be described as having the mountain-like profile as shown in FIG. 1.

Figure 3:
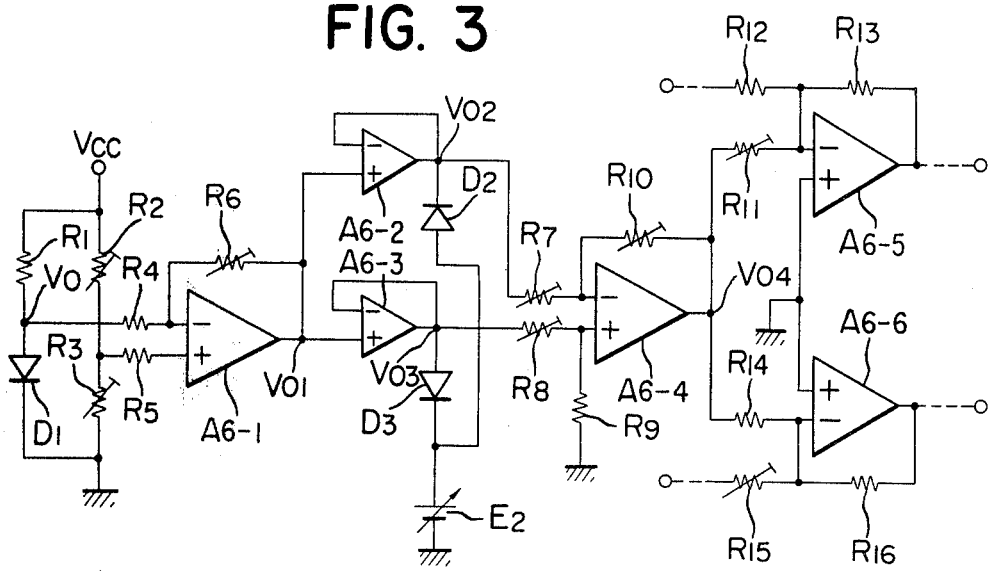
FIG. 3 shows the compensation output generating circuit in the block diagram of FIG. 2.

FIG. 3 is a circuit diagram showing an embodiment of the compensation output generating circuit. In FIG. 3, a resistor $R_1$ and a diode $D_1$ are series-connected between a power supply terminal $V_{cc}$ and the ground. The resistor $R_1$ adjusts the current flowing to the diode $D_1$. The resistor $R_1$ may be a constant current source. Variable resistors $R_2$ and $R_3$ are also series-connected between the power supply terminal $V_{cc}$ and the ground. The junction between the resistor $R_1$ and the diode $D_1$ is connected to the inverting input terminal of the operational amplifier $A_{6-1}$ through a resistor $R_4$. The junction between a resistor $R_2$ and a resistor $R_3$ is connected to the non-inverting input terminal of the operational amplifier $A_{6-1}$ through a resistor $R_5$. A variable resistor $R_6$ is connected to the negative feedback circuit of the operational amplifier $A_{6-1}$.

Figure 4:
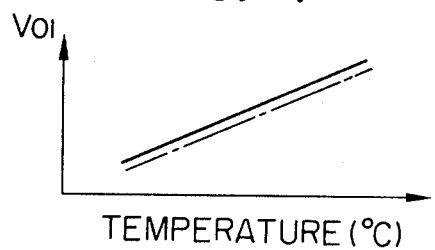

Now, if the diode $D_1$ is a silicon diode, the temperature dependency of its forward voltage drop Vo is almost independent of the forward current value at $-1.9$ to $-2.1$ mV/°C., and varies approximately linearly with temperature variation. Therefore, the voltage Vo1 at the output terminal of the operational amplifier $A_{6-1}$ is varied approximately linearly at a certain inclination for temperature variation as shown in FIG. 4. When the values of the variable resistors $R_2$ and $R_3$ are varied, the inclination of the voltage Vo1 is not varied but only the level is shifted parallel in vertical direction. When the value of the variable resistor $R_6$ is varied, the inclination of the voltage Vo1 is varied. What has been described above constitutes a temperature detecting circuit for generating an output voltage approximately proportional to temperature.

The output voltage Vo1 from the operational amplifier $A_{6-1}$ is applied to the non-inverting input terminals of followers $A_{6-2}$ and $A_{6-3}$, respectively. Diodes $D_2$ and $D_3$ are series-connected between the output terminal of the follower $A_{6-2}$ and the output terminal of the follower $A_{6-3}$. The cathode of the diode $D_2$ is connected to the output terminal of the follower $A_{6-2}$, and the anode of the diode $D_3$ is connected to the output terminal of the follower $A_{6-3}$ and the cathode thereof is connected to the anode of the diode $D_2$. A reference power source $E_2$ is connected to the junction between the diodes $D_2$ and $D_3$. The diode $D_2$ and the reference power source $E_2$ together constitute a first clip circuit, and the diode $D_3$ and the reference power source $E_2$ together constitute a second clip circuit. Now, the output voltage Vo2 of the follower $A_{6-2}$ is increased and decreased, normally following the output voltage Vo1 of the amplifier $A_{6-1}$, but the voltage below the voltage $V_{ref}$ of the reference power source $E_2$ is replaced by a reference voltage $E_2$ due to the action of the first clip circuit and has an output characteristic as shown in FIG. 5. The output voltage Vo3 of the follower $A_{6-3}$ is also increased and decreased, normally following the output voltage Vo1 of the operational amplifier $A_{6-1}$, but the voltage above the voltage $V_{ref}$ is cut off due to the action of the second clip circuit and has the output characteristic as shown in FIG. 6. By varying the voltage of the reference power source $E_2$, the value at which the output voltages of the followers $A_{6-2}$ and $A_{6-3}$ are cut off, namely, the temperature To at which followers $A_{6-2}$ and $A_{6-3}$ can generate a voltage, following the output of the operational amplifier $A_{6-1}$, can be selected. The temperature is the same for both of the follower $A_{6-2}$ and the follower $A_{6-3}$. It is also possible to provide the reference power source $E_2$ separately for the diodes $D_2$ and $D_3$ in order to eliminate the discontinuity of the output resulting from the forward voltage drop in the diode.

The voltage Vo2 of the follower $A_{6-2}$ is applied to the non-inverting input terminal of the operational amplifier $A_{6-4}$ through a resistor $R_7$, and the output voltage Vo3 of the follower $A_{6-3}$ is applied to the non-inverting input terminal of the operational amplifier $A_{6-4}$ through the voltage divider circuit of resistors $R_8$ and $R_9$. A variable resistor $R_{10}$ is connected to the negative feedback circuit of the operational amplifier $A_{6-4}$. What has been described above constitutes a differential amplifier, and the differential voltage between the output voltages Vo2 and Vo3 appears as the output voltage Vo4 of the operational amplifier $A_{6-4}$, as shown in FIG. 7. In FIG. 7, the inclination of the portion of the output voltage Vo4 which is increased in the positive direction with temperature rise can be adjusted by increasing or decreasing the value of the variable resistor $R_8$, and the inclination of the portion of the output voltage Vo4 which is increased in the negative direction with temperature rise can be adjusted by increasing or decreasing the value of the variable resistor $R_7$. The output voltage Vo4 of the operational amplifier $A_{6-4}$ has been converted so as to exhibit a temperature characteristic substantially similar to that of the shutter mechanism shown in FIG. 1. Therefore, the output voltage Vo4 provides the basic information for compensating for the temperature characteristic of the shutter mechanism.

The inverting input terminal of an operational amplifier $A_{6-5}$ whose non-inverting input terminal is grounded is connected to the output terminal of the operational amplifier $A_{6-4}$ through an adder resistor $R_{11}$, and is also connected to the output terminal of the amplifier (not shown) of the output stage of the operation circuit A-1 through an adder resistor $R_{12}$. The point where the adder resistor $R_{12}$ is connected may be varied such as an amplifier intermediate of the operation circuit A-1 and what is important is that the auto output voltage $V_{aut}$ of the operation circuit and the output voltage Vo4 of the operational amplifier $A_{6-4}$ are added together. A resistor $R_{13}$ is disposed in the negative feedback circuit of the operational amplifier $A_{6-5}$. In this case, the output voltage of the amplifier $A_{6-5}$ is directly applied to one input terminal X of the comparator circuit A-3. What has been described above constitutes an adder circuit which adds the output voltage Vo4 of the operational amplifier $A_{6-4}$ to the voltage $V_{aut}$ corresponding to the proper shutter time determined by the brightness of the object, aperture value and film sensitivity which has been output by the operation circuit A-1, and which generates an auto voltage $V_{aut'}$ compensated for as shown in FIG. 8. By selecting the value of the resistor $R_{11}$, the final inclination of the voltage $V_{aut'}$ can be adjusted.

The inverting input terminal of an operational amplifier $A_{6-6}$ whose non-inverting input terminal is grounded is connected to the output terminal of the operational amplifier $A_{6-4}$ through an adder resistor $R_{14}$, and is also connected to the amplifier (not shown) of the output stage of the operation circuit A-2, for example, through an adder resistor $R_{15}$. A resistor $R_{16}$ is connected to the negative feedback circuit of the operational amplifier $A_{6-6}$. The output voltage of this operational amplifier $A_{6-6}$ is directly used as a voltage applied to the ladder resistor in the aforementioned operation circuit A-2. What has hitherto been described constitutes a second adder circuit, and a voltage resulting from the addition of the voltage of the operation circuit A-2 and the output voltage of the operational amplifier A$_{6-4}$ is output at the output terminals 3-1 to 3-n, and after all, a compensated manual output voltage V$_{manu}$' is generated at each of the terminals 3-1 to 3-n, as shown in FIG. 8. By adjusting the value of the resistor R$_{14}$, the final adjustment of the manual voltage V$_{manu}$' can be accomplished.

The voltages V$_{aut}$' and V$_{manu}$' respectively correspond to the shutter time when the automatic exposure adjustment followed diaphragm opening and the shutter time when the manual control is effected, and no difference in value occurs between these if the two shutter times are the same.

This embodiment constructed as described above operates in the following manner: A voltage Vo representing a variation substantially proportional to the temperature generated at the diode D$_1$ is converted by adjustment of the variable resistors R$_2$, R$_3$ and R$_6$ into a voltage Vo1 having a necessary inclination and level. Then, the voltage Vo1 is converted by adjustment of the voltage V$_{ref}$ of the reference power source E$_2$ into two voltages Vo2 and Vo3 having their upper or lower portion clipped at the temperature at the bending point of the characteristic shown in FIG. 1. By changing the clip level by adjustment of the voltage V$_{ref}$, even if the bending point of the temperature characteristic of the shutter mechanism is deviated toward the higher temperature side or the lower temperature side, or if the bending point substantially disappears, correspondence becomes possible.

The voltages Vo2 and Vo3 are applied to the two input terminals of the operational amplifier A$_{6-4}$ and converted into a mountain-shaped voltage Vo4 as shown in FIG. 7. This voltage Vo4, as is apparent from this Figure, has temperature compensating information. By adjustment of the resistors R$_7$ and R$_8$, the voltage Vo4 has its inclination determined so as to correspond to the temperature characteristic of the shutter mechanism. This voltage Vo4, as shown in FIG. 8, is added to the output voltage of the operation circuit A-1 or the voltage at the intermediate process stage thereof by the operational amplifier A$_{6-5}$ or the like, thus providing a compensated auto voltage V$_{aut}$' on the one hand, and is added to the output voltage of the operation circuit A-2 or the voltage at the intermediate process stage by the operational amplifier A$_{6-6}$, thus providing a compensated manual voltage V$_{manu}$' on the other hand.

Now, as is apparent from FIG. 8, the voltages produced at the output terminals 1-1, 3-1 to 3-n exhibit a characteristic such that these voltages rise for temperature variation toward the opposite sides of a certain temperature To at a particular shutter time, e.g. 1/2000 sec. Therefore, the shutter time gradually becomes faster on the opposite sides of the temperature To. This could be understood from the fact that the comparator circuit A-3 operates such that the shutter time becomes faster if the output voltages V$_{aut}$ and V$_{manu}$ are higher and that the shutter time becomes slower if these voltages are lower.

In the manner described above, the temperature characteristic of the shutter mechanism is electrically compensated for and this may be accomplished at the shutter times 1/4000, 1/2000 sec., etc. as well as at the slow shutter times 1/16, ⅛ sec., etc.

In FIG. 1, the reference temperature for the variation of the shutter time is 20° C. and the bending point of the temperature characteristic is about 5° C., and there is a deviation between these. However, such a deviation does not offer any problem because the bending point of the output voltage Vo4 of the operational amplifier A$_{6-4}$ can be deviated by varying the voltage of the reference power source E$_2$.

Further, the comparator A-3 drives the magnet Mg such that the higher the output voltages V$_{aut}$ and V$_{manu}$, the faster the shutter time and that the lower the voltage V$_{aut}$ and V$_{manu}$ the slower the shutter time, but this may be in the reverse relation.

Also, even if the first and second adder circuits are replaced by subtraction circuits, the same compensation as that described above can be accomplished with the only exception that the manner of signal treatment becomes different.

In the circuit just described, information on the temperature characteristic of the shutter mechanism has been imparted to the voltages V$_{aut}$ and V$_{manu}$ as one input of the comparator circuit A-3, but FIG. 9 shows an embodiment in which such information is imparted to the other input of the comparator circuit A-3, namely, the integration voltage V$_{int}$.

In FIG. 9, a follower A$_{7-1}$ produces at its output terminal a voltage Vo7 following the integration voltage V$_{int}$ produced at the junction between the resistor 5 and the capacitor 6. This is shown by the curve a in FIG. 10.

Figure 10:
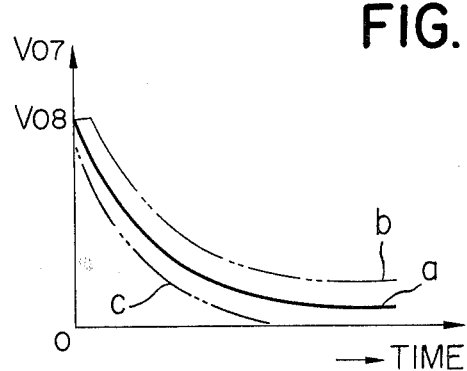
FIG. 10 shows the temperature of the integration voltage curve in FIG. 9 as parameter.

An operational amplifier A$_{7-2}$ and resistors R$_{20}$-R$_{24}$ together constitute an adder circuit. The output voltage Vo7 of the follower A$_{7-1}$ is applied through an adder resistor R$_{20}$ to the non-inverting input terminal of the operational amplifier A$_{7-2}$. The output voltage Vo4 of the operational amplifier A$_{6-4}$ is applied through an adder resistor R$_{21}$ to the non-inverting input terminal of the operational amplifier A$_{7-2}$. Therefore, the voltage shown in FIG. 7 and the voltage indicated by the curve a in FIG. 10 are added together and the entire level of the output voltage Vo8 of the operational amplifier A$_{7-2}$ is varied as shown by the curves b and c in FIG. 10, in accordance with the temperature variation. In the circuit of FIG. 9, when the shutter release is started and the forward shutter curtain (not shown) starts to move, the switch S$_1$ is open so that a high voltage is applied to the inverting input terminal side of the comparator circuit A-3 to produce a low voltage at the output of the comparator circuit A-3, thus energizing the magnet Mg which thus restrains the rearward shutter curtain. If the output voltage Vo8 at a temperature of t$_1$° is the curve b, the voltage Vo8 is varied as shown by the curve b after the opening of the switch S$_1$ and the voltage Vo8 becomes equal to the aforementioned output voltage V$_{aut}$ or V$_{manu}$, whereupon the comparator circuit A-3 produces a high voltage at the output thereof, thus deenergizing the magnet Mg.

If the output voltage Vo8 at a temperature of t$_2$° is the curve c, then the time between the opening of the switch S$_1$ until the output voltage Vo8 becomes equal to the output voltage V$_{aut}$ or V$_{manu}$ is shorter than when the temperature is t$_2$°, namely, the shutter time becomes faster.

Figure 12:
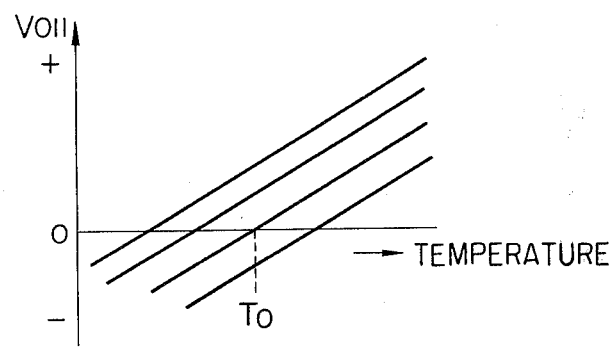
FIGS. 12 and 13 illustrate variations in output voltage for variation in temperature.
Figure 11:
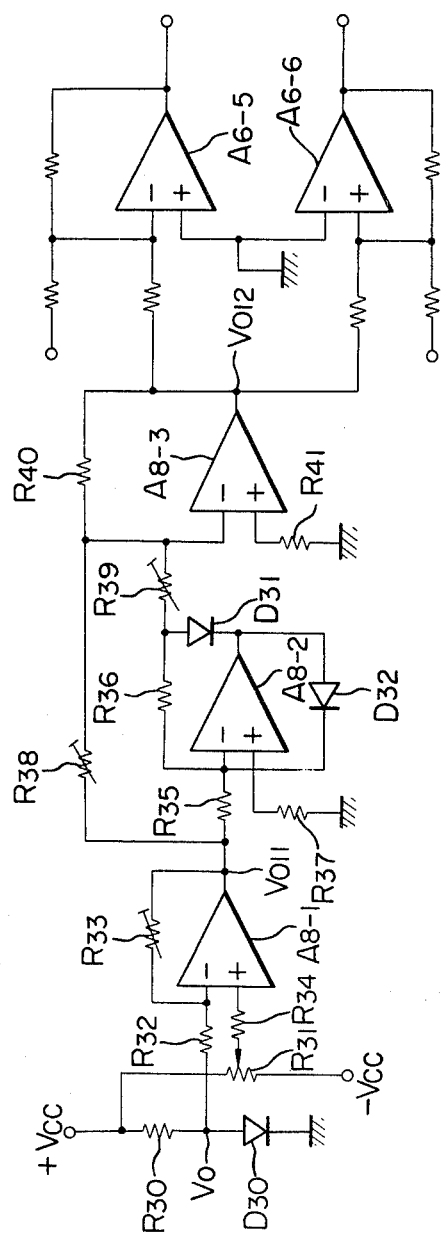
FIG. 11 shows another embodiment of the compensation circuit of the present invention.

FIG. 11 is a circuit diagram showing another embodiment of the compensation circuit. In FIG. 11, a resistor R$_{30}$ and a diode D$_{30}$ which is a temperature detecting element are series-connected between the positive power supply terminal +V$_{cc}$ and the ground. The resistor R$_{30}$ may be replaced by a constant current source. Also, a variable resistor R$_{31}$ is connected between the positive power supply terminal +V$_{cc}$ and the negative power supply terminal $-V_{cc}$. A resistor $R_{32}$ is connected between the junction between the resistor $R_{30}$ and the diode $D_{30}$ and the inverting input terminal of an operational amplifier $A_{6-1}$, and a variable resistor $R_{33}$ is disposed in the negative feedback circuit of an operational amplifier $A_{8-1}$. The non-inverting input terminal of the operational amplifier $A_{8-1}$ is connected to the variable resistor $R_{31}$ through a resistor $R_{34}$. Now, since the forward voltage drop of the diode $D_{30}$ varies substantially in proportion to temperature, the output voltage Vo11 of the operational amplifier $A_{8-1}$ rise and falls approximately linearly at a certain inclination with respect to temperature variation, as shown in FIG. 12. When the value of the variable resistor $R_{31}$ is varied, the level of the output voltage Vo11 is parallel-shifted in the positive or the negative direction. Also, when the value of the variable resistor $R_{33}$ is varied, this inclination is varied. What has been described above constitutes a temperature detecting circuit which produces an output voltage substantially proportional to temperature.

Figure 13:
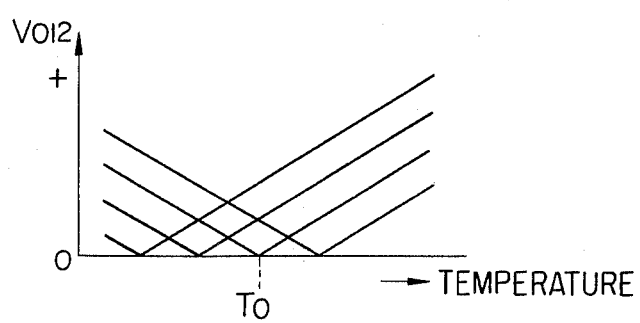

The inverting input terminal of the operational amplifier $A_{8-2}$ is connected through a resistor $R_{35}$ to the output terminal of the operational amplifier $A_{8-1}$. A series circuit of resistor $R_{36}$ and diode $D_{31}$ and a diode $D_{32}$ are parallel-connected between the inverting input terminal and the output terminal. The non-inverting input terminal of the operational amplifier $A_{8-2}$ is grounded through a resistor $R_{37}$. The inverting input terminal of an operational amplifier $A_{8-3}$ is connected to the output terminal of the operational amplifier $A_{8-1}$ and connected through a resistor $R_{39}$ to the junction between the resistor $R_{36}$ and the diode $D_{31}$. A resistor 40 is disposed in the negative feedback circuit of the operational amplifier $A_{8-3}$ and the non-inverting input terminal thereof is grounded through a resistor $R_{41}$. What has been described above constitutes an absolute value circuit, whereby an output voltage Vo12 having taken the absolute value of the output voltage of the operational amplifier $A_{8-1}$, as shown in FIG. 13, is produced at the output terminal of the operational amplifier $A_{8-2}$. The temperature at the bending point of this output voltage Vo12 is adjusted by a variable resistor $R_{31}$. This is because the resistor $R_{31}$ causes the level of the output voltage Vo11 of the operational amplifier $A_{8-1}$ to be parallel-shifted in the positive or the negative direction. Also, the inclination at the right side of the bending point of this output voltage Vo12 can be adjusted by varying the value of the variable resistor $R_{39}$ and the inclination at the left side of the bending point can be adjusted by varying the value of the variable resistor $R_{36}$.

This output voltage Vo12, as is apparent from FIG. 13, has a characteristic such that it rises on the opposite sides of a certain temperature as a bending point and therefore, it provides basic information for compensating for the temperature characteristic of the shutter mechanism. Accordingly, it is necessary to adjust the output voltage Vo12 of the operational amplifier $A_{8-3}$ by means of the variable resistors $R_{31}$, $R_{33}$, $R_{38}$ and $R_{39}$ so as to be suited for the temperature characteristic of the shutter mechanism. This output voltage, as already described, is passed through the adder circuit or the subtraction circuit, whereby it is applied to the operation circuits A-1 and A-2 to compensate for the temperature characteristic of the shutter mechanism.

In the embodiments hitherto described, the voltage having the temperature dependency of the diode has been treated, but even those whose output is a current such as a thermistor or a thermocouple can be likewise treated. The only difference is whether the signal is treated as a voltage or as a current.

Description has hitherto been made of the temperature compensation for the device in which the shutter time is controlled by an analog electric circuit, but description will hereinafter be made of the device in which the shutter time is controlled by a digital electric circuit.

Figure 14:
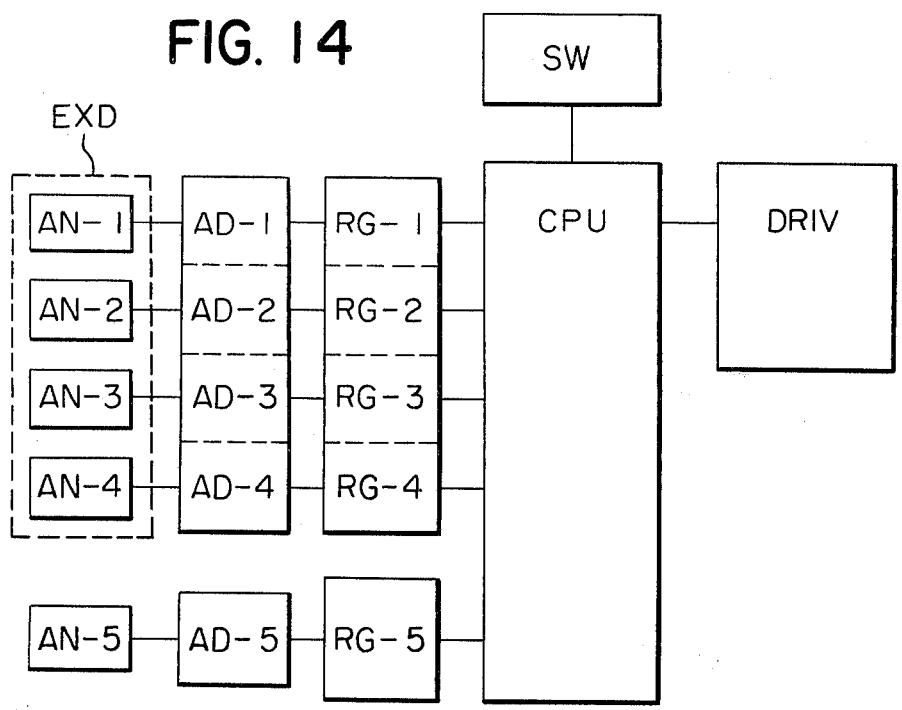
FIG. 14 is a block diagram of the digital electric circuit according to the present invention.

In FIG. 14, EXD designates data input means for entering various data concerning exposure control and its output is an analog signal. AN-1 is a means generating an output corresponding to the brightness of the object to be photographed. AN-2 is a means generating an output corresponding to an aperture value set by the objective lens. AN-3 is a means generating an output corresponding to a shutter speed selected by the shutter dial of the camera. AN-4 is a means generating an output corresponding to the sensitivity of the film in use set by the film sensitivity input dial of the camera. The analog signal outputs of AN-1 to AN-4 are converted into digital signals by analog digital converters AD-1 to AD-4, respectively. The digital signal outputs of AD-1 to AD-4 are temporarily stored in registers RG-1 to RG-4, respectively and suitably applied to a central processing unit CPU. A switching circuit SW applies to the CPU the auto signal and manual signal produced by the change-over between auto photography and manual photography effected by the use of a change-over dial and a release signal produced in synchronism with releasing operation. When receiving the auto signal, the CPU calls the digital signals of the registers RG-1, RG-2, and RG-4 during the input of the release signal, obtains a proper shutter time corresponding to the exposure factors such as the brightness of the object, etc., measures the lapse of time from the beginning of the forward shutter curtain movement and, when the shutter time and the lapse of time assume a predetermined relationship, drives the magnet through a driver DRIV to cause movement of the rearward shutter curtain. In this manner, the exposure is terminated. Also, when receiving the manual signal, the CPU calls the digital signal of the register RG-3 during the input of the release signal, obtains a shutter time to be controlled, measures the lapse of time from the beginning of the forward shutter curtain movement, and when the shutter time and the lapse of time assume a predetermined relationship, drives the magnet through the driver DRIV, thus terminating the exposure as already described. What has hitherto been described constitutes a known digital exposure control circuit. Now, the analog output signal of means AN-5 which generates a compensation output corresponding to a temperature variation which corresponds to the compensation output generating circuit A-5 is converted into a digital signal by an analog-digital converter AD-5. This digital signal is temporarily stored in a register RG-5 and then applied to the CPU. Thus, during the control of the shutter time, the CPU effects temperature compensation of the shutter time with the output of the register RG-5 as the compensation input.

Figure 15:
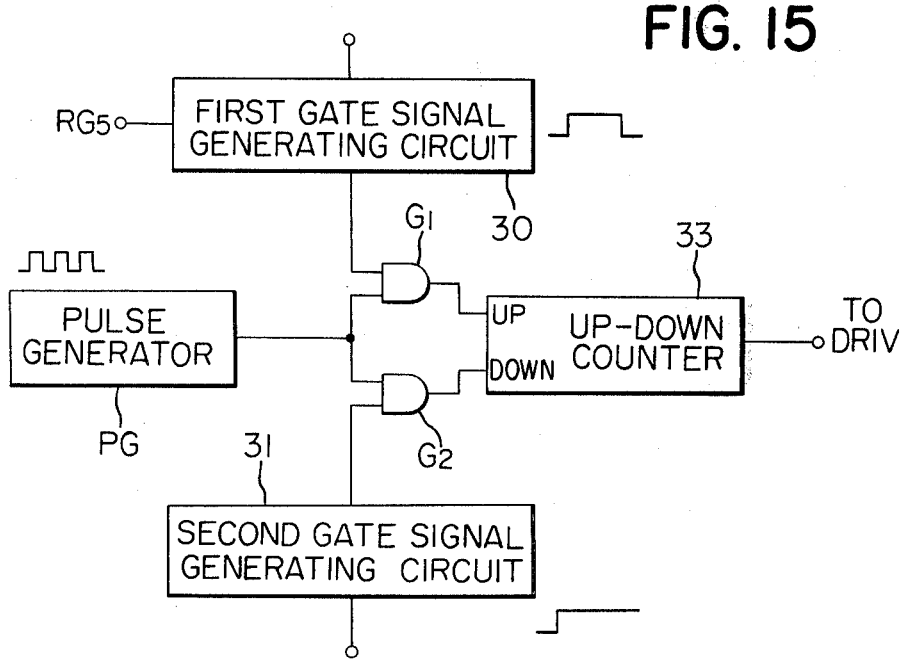
FIG. 15 shows the temperature compensation circuit within the CPU in FIG. 14.

Reference is now had to FIG. 15 to describe the temperature compensating operation in the CPU. In FIG. 15, a pulse generator PG generates a clock pulse for controlling the entire CPU. A first gate signal generating circuit 30, during auto photography, generates a positive output pulse having a pulse width corresponding to the shutter time which will provide a proper exposure in accordance with the outputs of the registers RG-1, RG-2 and RG-4, and during manual photography, generates an output pulse having a pulse width corresponding to any desired shutter time in accordance with the output of the register RG-3. A second gate signal generating circuit 31 generates a positive output pulse in synchronism with the movement of the forward shutter curtain. The output of a first gate G1 which receives as input the pulse output of the first gate signal generating circuit 30 and the clock pulse of the pulse generator is applied to the up input of an up-down counter 33, and the output of a second gate circuit G2 which receives as input the pulse output of the second gate signal generating circuit 32 and the aforementioned clock pulse is applied to the down input of the up-down counter 33.

Now, during both auto and manual photography, the up-down counter 33 counts in the positive direction the number of clock pulse corresponding to the pulse width of the output pulse of the first gate signal generating circuit 30 and stores such number. Next, when the forward shutter curtain is moved by the releasing operation, the up-down counter 33, the down input to which has been applied a clock pulse by the output pulse of the second gate signal generating circuit 31, begins to count in the negative direction and offsets the count corresponding to the shutter time stored prior to the release. When the count by the up-down counter becomes zero, the rearward shutter curtain is caused to move by the driver DRIV to terminate the exposure.

In such a device, if the pulse width of the output pulse of the first gate signal generating circuit 30 is changed by the output of the register RG-5, the temperature compensation of the shutter time becomes possible.

According to the present invention, as has been described above, the variation in shutter time with the temperature characteristic of the camera's shutter mechanism can be electrically compensated for and this leads to an improved accuracy of the compensation over the prior art compensation, as well as to simplification of the compensation adjustment, and greatly contributes to reduction in size of the camera.

Further, according to the present invention, the range of the temperature characteristic of the shutter mechanism which can be compensated for is increased.

We claim:

1. A device for compensating for the shutter time temperature characteristic of a camera shutter mechanism controlled by an electrical voltage, comprising means for detecting ambient temperature variations, and control means connected to the detecting means for generating a control voltage dependent upon the ambient temperature and the shutter time temperature characteristic of the shutter mechanism for controlling the shutter mechanism to substantially eliminate time variations in the shutter mechanism due to temperature.

2. A device according to claim 1 wherein the shutter time temperature characteristic of the shutter mechanism peaks at a certain temperature, on either side of which shutter time is slower than at said certain temperature.

3. A device according to claim 1 wherein the detecting means generates a temperature output voltage corresponding to the detected temperature variations, and wherein the means for generating a control voltage comprises a converting circuit for converting the temperature output voltage to a compensating voltage having a predetermined relationship to the shutter time temperature characteristic of the shutter mechanism.

4. A device according to claim 3 wherein the converting circuit includes means for generating a compensating voltage which varies with temperature in the same manner as the shutter time temperature characteristic of the shutter mechanism.

5. A device according to claim 3 wherein the converting circuit further comprises means for shifting the temperature output voltage positively and negatively with respect to a predetermined reference voltage so that a predetermined temperature corresponds to the predetermined reference voltage, a first clip circuit for clipping the shifted temperature output voltage at the predetermined reference voltage for voltages below the predetermined temperature, a second clip circuit for clipping the temperature output voltage at the predetermined reference voltage for voltages above the predetermined temperature, and a differential amplifier for differentially combining the outputs from the first and second clip circuits to provide a compensating voltage which reverses its direction of variation at the predetermined temperature.

6. A device according to claim 5 further comprising means for varying the reference voltage.

7. A device according to claim 5 wherein the converting circuit further comprises means for independently varying the inclination of the outputs from the first and second clip circuits to provide a compensating voltage which varies with temperature in the same manner as the shutter time temperature characteristic of the shutter mechanism.

8. A device according to claim 3 wherein the converting circuit further includes means for generating an output voltage which varies inversely to the shutter time temperature characteristic of the shutter mechanism.

9. A device according to claim 3 wherein the converting circuit further comprises means for shifting the temperature output voltage positively and negatively with respect to ground voltage so that a predetermined temperature corresponds to ground voltage, and an absolute value circuit connected to the shifting means to provide a compensating voltage corresponding to the absolute value of the shifted temperature output voltage, the compensating voltage reversing its direction of variation at the predetermined temperature.

10. The device of claim 9 wherein the converting circuit further includes means for varying the inclination of the shifted temperature output voltage on either side of said predetermined temperature, to provide a compensating voltage having said predetermined relationship to the shutter time temperature characteristic.

11. A device according to claim 3 further comprising a first circuit for generating a shutter time voltage corresponding to a desired shutter time, and wherein said control means includes means for combining the shutter time voltage with the compensating voltage to generate the control voltage.

12. A device according to claim 11 wherein the first circuit includes means for automatically generating the shutter time voltage in accordance with automatically measured exposure parameters.

13. A device according to claim 11 wherein the first circuit generates the shutter time voltage in accordance with a manually selected shutter time.

14. A device according to claim 11 further comprising a second circuit for generating an elapsed time voltage corresponding to the elapsed time from the opening of the shutter to begin an exposure, and a third circuit which closes the shutter to terminate the exposure when the output of the second circuit and the control voltage have assumed a predetermined relationship.

15. A device according to claim 14 wherein the second circuit is an integrator which generates an output voltage corresponding to said elapsed time of exposure.

16. A device according to claim 15 wherein the third circuit is a comparator circuit which terminates the exposure when the output voltage from the integrator circuit is equal to the control voltage.

17. A device according to claim 14 wherein said first, second and third circuits and digital circuits, and wherein said control means comprises means for generating a digital signal corresponding to said compensating voltage and means for digitally combining the compensating voltage with the output voltages from the first and second circuits to provide said control voltage.

18. A device according to claim 11 further comprising a second circuit for generating an elapsed time voltage corresponding to the elapsed time from the opening of the shutter to begin an exposure and wherein the output voltage from the second circuit is combined with the compensating voltage and the shutter time voltage to provide said control voltage.

* * * * *